US011437682B2

(12) United States Patent
Takano et al.

(10) Patent No.: US 11,437,682 B2
(45) Date of Patent: Sep. 6, 2022

(54) BATTERY MODULE COMPRISING AN EXHAUST DUCT ISOLATED FROM A COOLING DUCT

(71) Applicant: Panasonic Intellectual Property Management Co., Ltd., Osaka (JP)

(72) Inventors: Akira Takano, Osaka (JP); Hiroshi Takata, Hyogo (JP); Keisuke Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 294 days.

(21) Appl. No.: 16/466,163

(22) PCT Filed: Dec. 13, 2017

(86) PCT No.: PCT/JP2017/044637
§ 371 (c)(1),
(2) Date: Jun. 3, 2019

(87) PCT Pub. No.: WO2018/123573
PCT Pub. Date: Jul. 5, 2018

(65) Prior Publication Data
US 2020/0067045 A1    Feb. 27, 2020

(30) Foreign Application Priority Data
Dec. 27, 2016  (JP) ............................ JP2016-252632

(51) Int. Cl.
*H01M 50/35*    (2021.01)
*H01M 10/613*   (2014.01)
(Continued)

(52) U.S. Cl.
CPC ......... *H01M 50/35* (2021.01); *H01M 10/613* (2015.04); *H01M 10/6566* (2015.04);
(Continued)

(58) Field of Classification Search
CPC ...... H01M 50/35; H01M 50/30; H01M 50/20; H01M 50/342; H01M 50/367; H01M 10/613; H01M 10/6566; H01M 2200/20
See application file for complete search history.

(56) References Cited

U.S. PATENT DOCUMENTS

| 2005/0170239 | A1* | 8/2005 | Uemoto | ............... | H01M 10/625 |
| | | | | | 429/120 |
| 2010/0173181 | A1* | 7/2010 | Okada | ................. | H01M 50/308 |
| | | | | | 429/53 |

(Continued)

FOREIGN PATENT DOCUMENTS

JP    2011-065906    3/2011

OTHER PUBLICATIONS

International Search Report of PCT application No. PCT/JP2017/044637 dated Mar. 20, 2018.

*Primary Examiner* — Christopher P Domone
*Assistant Examiner* — Kimberly Wyluda
(74) *Attorney, Agent, or Firm* — McDermott Will & Emery LLP (57) ABSTRACT

A battery module includes a partition wall to separate an upper space from a lower space, a first plate that defines the upper space together with the partition wall, and a second plate that is disposed above the first plate such that a gap is left between the first and second plates. A case has an opening that is formed to let the gap communicate with an outside of the case. The first plate has a through hole through which the upper space and the gap communicate. The battery module further includes a through path passing through the partition wall and each of the plates to let the lower space communicate with a space above the second plate. The upper space and the gap constitute an exhaust duct, while the lower space and a top space constitute a cooling duct.

7 Claims, 9 Drawing Sheets

(51) Int. Cl.
- H01M 50/30 (2021.01)
- H01M 50/367 (2021.01)
- H01M 50/284 (2021.01)
- H01M 10/6566 (2014.01)
- H01M 50/20 (2021.01)
- H01M 50/342 (2021.01)

(52) U.S. Cl.
CPC ......... *H01M 50/20* (2021.01); *H01M 50/284* (2021.01); *H01M 50/30* (2021.01); *H01M 50/342* (2021.01); *H01M 50/367* (2021.01); *H01M 2200/20* (2013.01)

(56) References Cited

U.S. PATENT DOCUMENTS

| | | |
|---|---|---|
| 2012/0164490 A1 | 6/2012 | Itoi et al. |
| 2014/0113167 A1 | 4/2014 | Itoi et al. |
| 2015/0140369 A1 | 5/2015 | Itoi et al. |
| 2017/0237055 A1* | 8/2017 | Shimizu ............... H01M 50/35 429/53 |
| 2021/0005943 A1* | 1/2021 | Park ................... H01M 10/617 |

* cited by examiner

BATTERY MODULE COMPRISING AN EXHAUST DUCT ISOLATED FROM A COOLING DUCT

This application is a U.S. national stage application of the PCT International Application No. PCT/JP2017/044637 filed on Dec. 13, 2017, which claims the benefit of foreign priority of Japanese patent application No. 2016-252632 filed on Dec. 27, 2016, the contents all of which are incorporated herein by reference.

TECHNICAL FIELD

The present disclosure relates to a battery module.

BACKGROUND ART

It is known that a conventional battery module housing a plurality of batteries in a case includes an exhaust duct to guide a gas to outside the case if the gas is emitted from a safety valve of any of the batteries in response to the generation of an abnormality in the battery. For example, PTL 1 discloses an exhaust duct that is divided into a first space and a second space by a partition wall disposed between a flat plate on one side of batteries and an external plate for a case or a bottom of the case. The first and the second spaces communicate through a through hole formed in the partition wall.

CITATION LIST

Patent Literature

PTL 1: Unexamined Japanese Patent Publication No. 2011-65906

SUMMARY OF THE INVENTION

In some cases, a battery module includes a cooling duct to let cooling air flow and reduce heat generated by charging or discharging of batteries. Preferably, the cooling duct is isolated from an exhaust duct. Efficiently forming the two ducts isolated from each other in a limited space inside the battery module is an important challenge.

A battery module according to the present disclosure includes a plurality of batteries each having a safety valve and a case in which the batteries are housed and arranged. The battery module further includes a partition wall to separate an upper space above a battery compartment housing the batteries in the case from a lower space communicating with an outside of the case and being formed in the battery compartment below the upper space, and a first plate disposed above the batteries so as to cover the batteries. The first plate defines the upper space together with the partition wall. The battery module further includes a second plate disposed above the first plate such that a gap is left between the first and the second plates, an opening that is formed in the case to let the gap communicate with the outside of the case, and a through path isolated from the upper space and the gap. The through path passes through the partition wall, the first plate, and the second plate to let the lower space communicate with a space above the second plate. The first plate has a through hole through which the upper space and the gap communicate. The upper space and the gap constitute an exhaust duct, while the lower space and the through path constitute a cooling duct.

A battery module according to the present disclosure enables efficient formation of an exhaust duct and a cooling duct that are isolated from each other.

DESCRIPTION OF EMBODIMENT

As described above, efficiently forming an exhaust duct and a cooling duct that are isolated from each other in a limited space inside a battery module is an important challenge. Although a cooling duct can serve as an exhaust duct, it is preferred that the two ducts be separated from each other from perspectives such as improved safety and protection of a circuit component and other parts. A battery module according to the present disclosure has a partition wall, a first plate, a second plate, and a through path passing through these parts and hence enables efficient formation of an exhaust duct and a cooling duct that are isolated from each other without leading to compromises such as a drop in the amount of installed batteries and upsizing of the module.

The battery module according to an aspect of the present disclosure has a circuit component in a space (a cooling space) above the second plate and thus enables cooling of the circuit component as well as the batteries. A high-temperature gas emitted from a safety valve of the battery does not flow into the space above the second plate. This prevents the circuit component from being damaged by heat. In particular, the first plate made of a metal plate and the second plate made of a resin plate contribute to readily reducing the impact of a high-temperature gas, if emitted, on the circuit component and other parts.

An example of an exemplary embodiment of the present disclosure will now be described in detail.

Drawings referred to in a description of the exemplary embodiment are schematically drawn, and thus dimensions of configuration elements illustrated in the drawings should be understood in view of the following description. In the description given herein, a direction in which a partition wall, a first plate, and a second plate are lined up is referred to as a "vertical direction" and a plurality of batteries is disposed below the plates.

The description given hereinafter illustrates battery module 10 as an example of the exemplary embodiment. However, the scope of the present disclosure should not be limited to the illustrated battery module. It is initially envisaged that an exemplary embodiment can be made by suitably combining some elements in any of the exemplary embodiment and modifications thereof described hereinafter.

Figure 1:
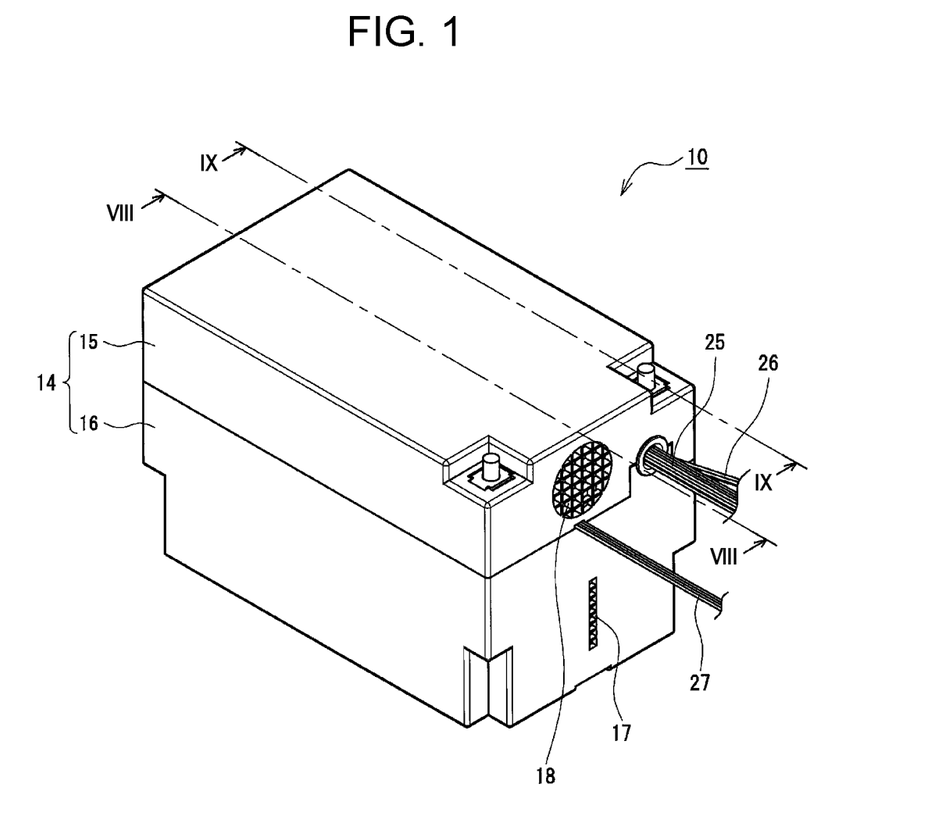
FIG. 1 is a front perspective view of a battery module according to an example of an exemplary embodiment.
Figure 2:
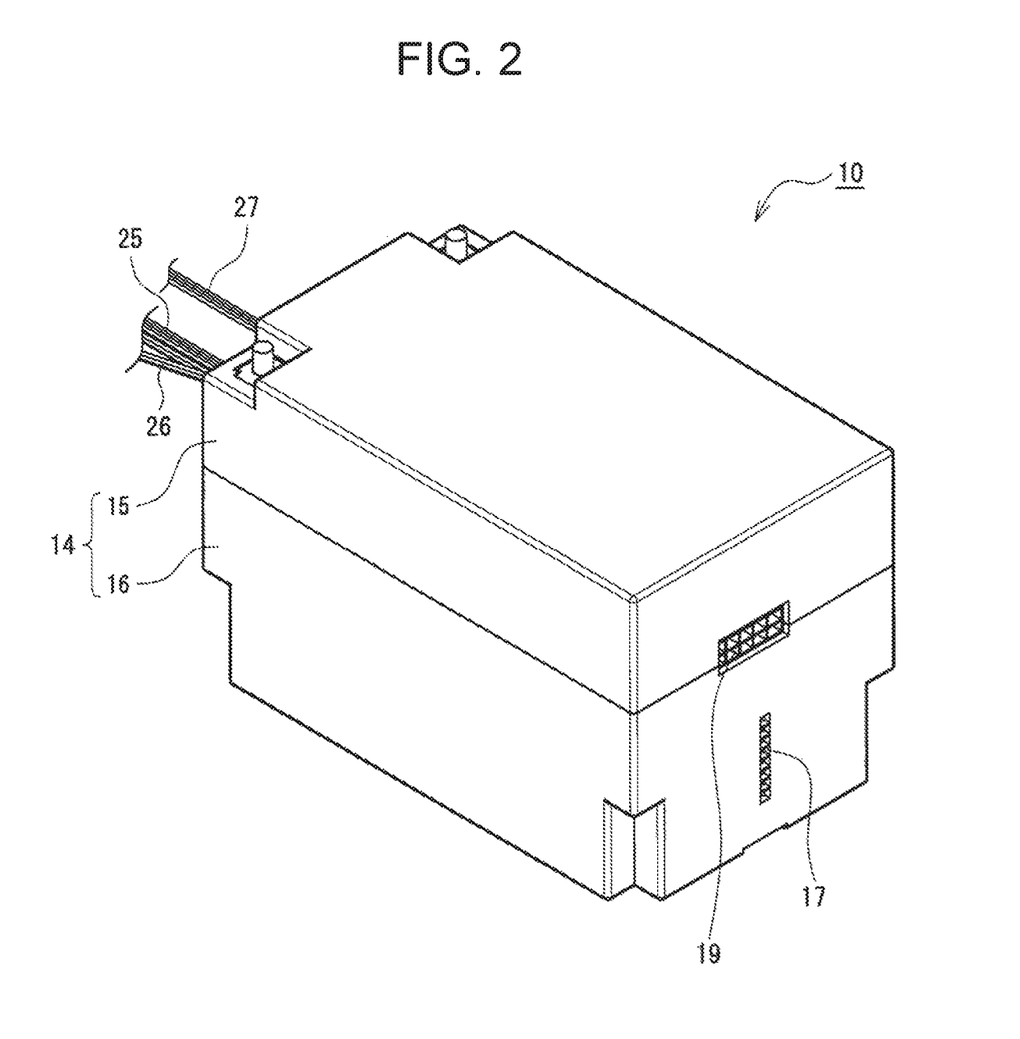
FIG. 2 is a rear perspective view of the battery module according to the example of the exemplary embodiment.
Figure 3:
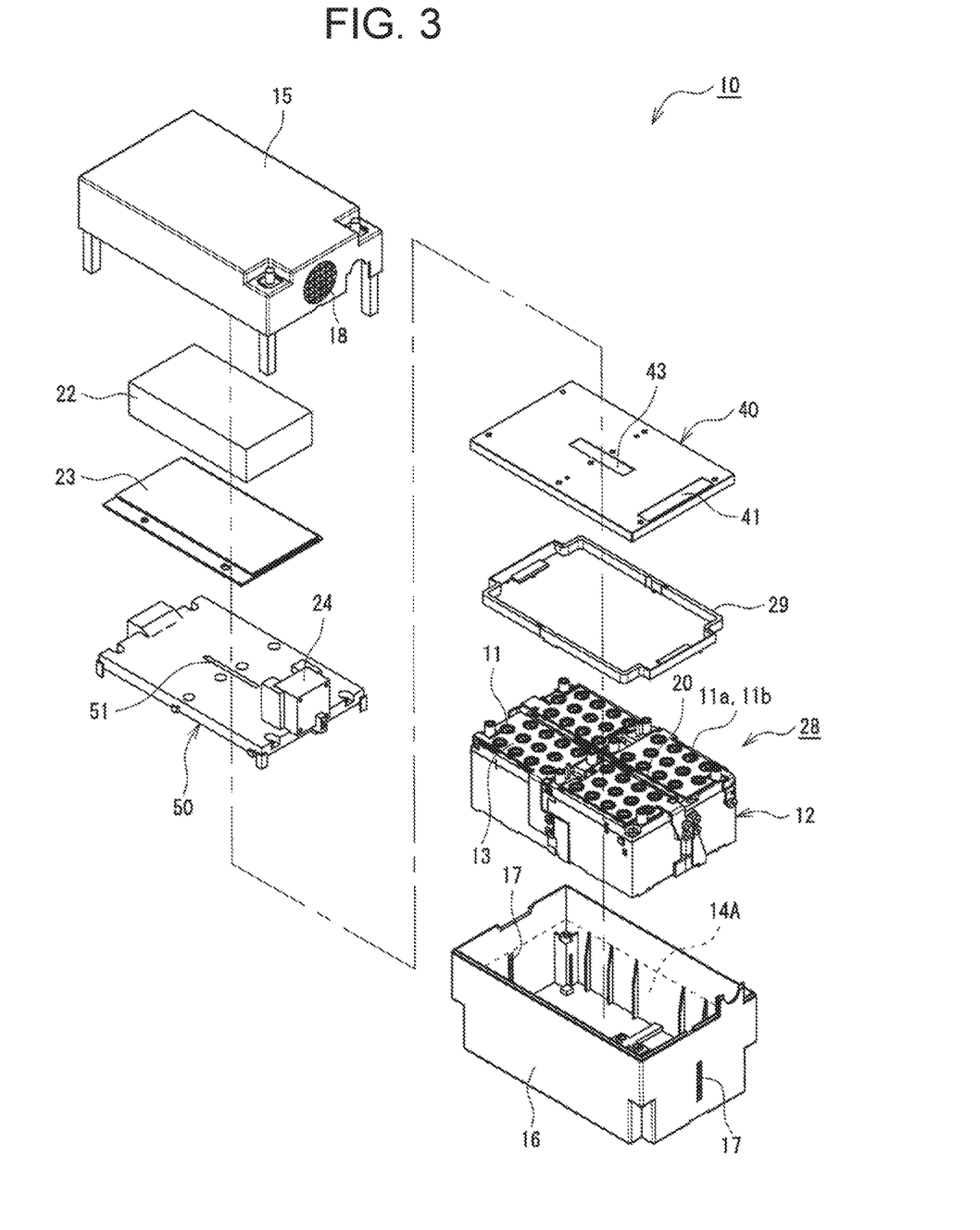
FIG. 3 is an exploded perspective view of the battery module according to the example of the exemplary embodiment.

FIG. 1 is a front perspective view of battery module 10, and FIG. 2 is a rear perspective view of battery module 10. FIG. 3 is an exploded perspective view of battery module 10 (illustration of parts such as cables, bus bars, and fastening screws is omitted). For explanatory convenience, a side adjacent to cooling air outlet 18 is referred to as a "front" of battery module 10, a side adjacent to gas outlet 19 is referred to as a "rear" of battery module 10, and a direction in which cooling air outlet 18 and gas outlet 19 are lined up is referred to as a "front-rear direction" of battery module 10.

As illustrated in FIGS. 1 to 3, battery module 10 includes a plurality of batteries 11 each having safety valve 11b and case 14 to house batteries 11. Batteries 11 are housed in a lower part of case 14. Each battery 11 is disposed inside case 14, with a portion of the battery provided with safety valve 11b facing upward. Batteries 11 are cylindrical batteries each having cylindrical battery case 11a and are housed inside case 14, with an axis of battery case 11a being aligned with the vertical direction. Safety valve 11b is, for example, disposed on one axial end surface of battery case 11a and is located at a top face of battery 11 while batteries 11 are housed inside case 14.

Battery module 10 includes a plurality of battery blocks 12 each housing batteries 11. In this exemplary embodiment, the battery module has four battery blocks 12 that each house 12 batteries 11. The plurality of batteries 11 housed in each battery block 12 is connected in parallel to a pair of current collector plates 13, and the plurality of battery blocks 12 is connected in series via current collector plates 13, for example. However, numbers, modes of connection, and other configuration elements of batteries 11 and battery blocks 12 are not limited to this example.

Batteries 11 are lithium-ion secondary batteries, for example. However, a type of the batteries is not limited to this example. Batteries 11 are not limited to cylindrical batteries, and may be prismatic batteries or in other forms. Batteries 11 may be directly housed in case 14 instead of being housed in battery blocks 12.

Battery module 10 has circuit component 22 housed in an upper part of case 14. In the upper part of case 14, fan 24 is also housed to supply cooling air to a cooling duct. In this exemplary embodiment, circuit component 22 and fan 24 are disposed above second plate 50 described later. In other words, circuit component 22 and fan 24 are disposed in top space 71, a space above second plate 50. Top space 71 is a cooling space into which cooling air flows and thus constitutes a part of the cooling duct. Circuit component 22 includes a control circuit board that has functions such as controlling electric power input into or output from battery module 10 and monitoring states of batteries 11, for example. The circuit component is disposed above second plate 50, with support 23 interposed between the two components.

Battery module 10 has electric cables that are drawn from a front of case 14. The electric cables are, for example, power cable 25 connected to batteries 11 through circuit component 22, signal cable 26 connected to circuit component 22, and fan cable 27 connected to fan 24. Generally, these electric cables are connected to a controller (not shown) or similar devices.

Battery module 10 includes partition wall 20 that separates upper space 60 (see FIGS. 8 and 9 described later) above battery compartment 14A from lower space 70 (see FIG. 8 described later). Battery compartment 14A houses batteries 11 inside case 14. The lower space communicates with an outside of case 14 and is formed in battery compartment 14A below upper space 60. Lower space 70 is formed between battery blocks 12. Batteries 11 are adjacent to lower space 70 through each battery block 12. As described in detail later, partition wall 20 is formed by combining upper holders 32 of battery blocks 12 together.

Battery module 10 further includes first plate 40 and second plate 50. First plate 40 is disposed above batteries 11 so as to cover batteries 11. The first plate together with partition wall 20 defines upper space 60. First plate 40 has through hole 41 through which upper space 60 and gap 61 communicate.

Second plate 50 is disposed above first plate 40 such that gap 61 (see FIGS. 7 and 8 described later) is left between first and second plates 40 and 50. Battery module 10 is provided with gas outlet 19, i.e. an opening that is formed in case 14 to let gap 61 communicate with the outside of case 14.

Battery module 10 further includes through path 51 being isolated from upper space 60 and gap 61 and passing through partition wall 20, first plate 40, and second plate 50 to let lower space 70 communicate with top space 71, a space above second plate 50. In this exemplary embodiment, through path 51 is formed by tubular part 56 (see FIG. 6 described later) extending downward from a bottom surface of second plate 50 facing gap 61. In this exemplary embodiment, through path 51 is formed so as to pass through longitudinally middles of first and second plates 40 and 50, respectively.

As described in detail later, in battery module 10, upper space 60 and gap 61 constitute an exhaust duct, and the cooling duct includes lower space 70 and through path 51. Since the exhaust duct and the cooling duct are isolated from each other, a high-temperature gas emitted from safety valve 11b of battery 11 does not normally flow into the cooling duct. In other words, the high-temperature gas does not flow into top space 71, which constitutes a part of the cooling duct, and circuit component 22 and fan 24 are not exposed to high-temperature gas. Cooling air does not flow into the exhaust duct. This configuration ensures a high degree of safety.

Figure 4:
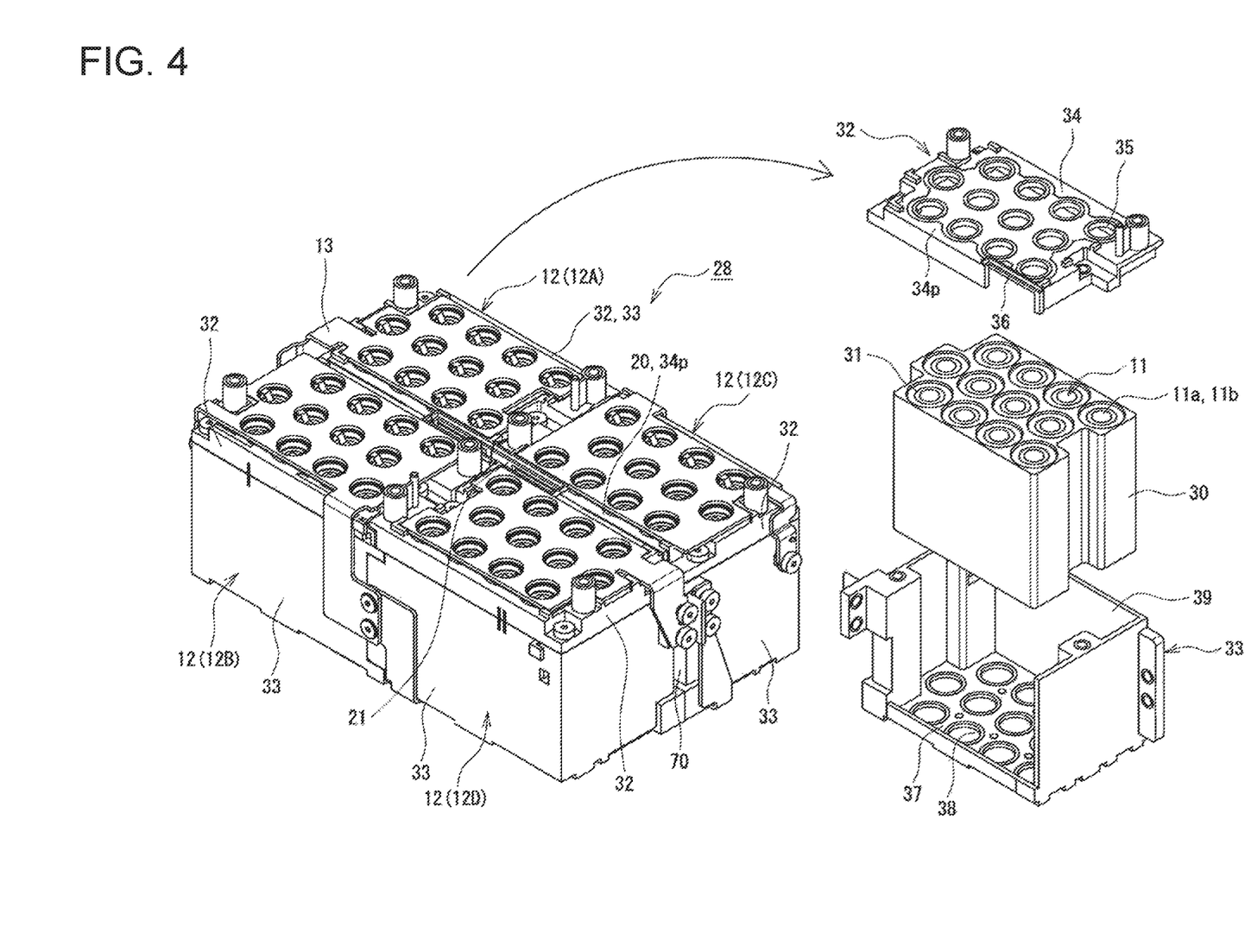
FIG. 4 is a perspective view of a battery block group made up of a plurality of battery blocks according to an example of the exemplary embodiment.
Figure 5:
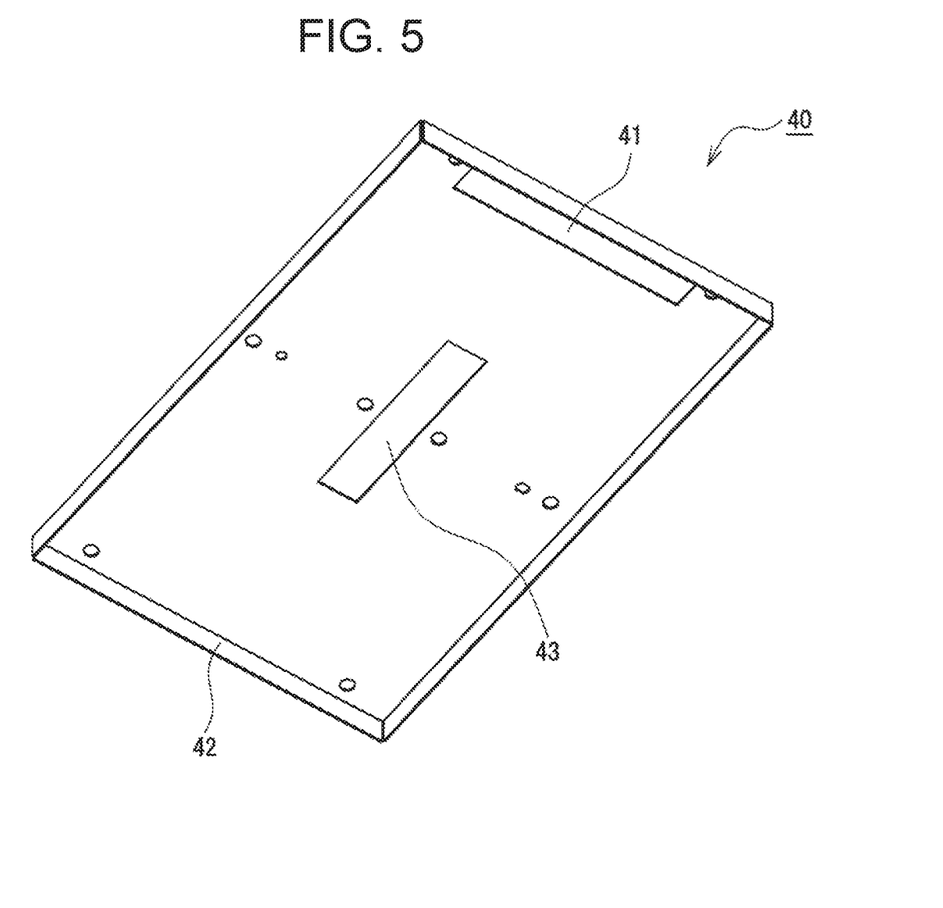
FIG. 5 is a bottom perspective view of a first plate according to an example of the exemplary embodiment.
Figure 6:
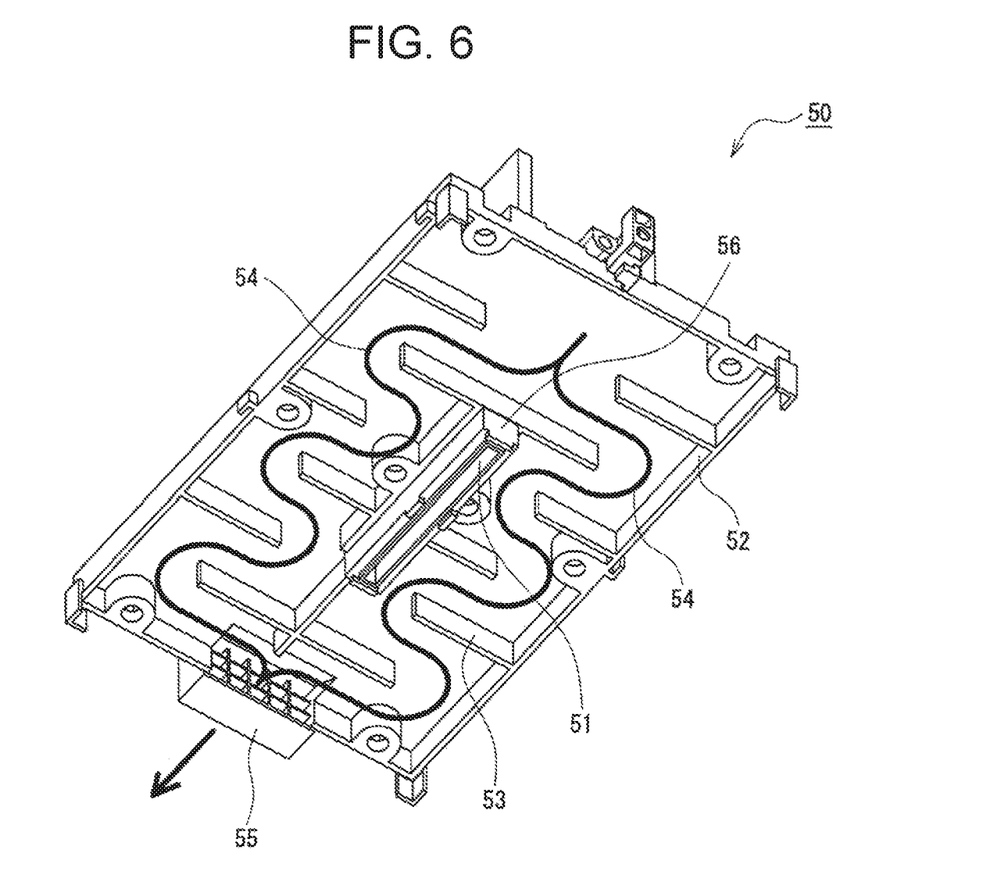
FIG. 6 is a bottom perspective view of a second plate according to an example of the exemplary embodiment.

With reference to FIGS. 4 to 6 as appropriate, in addition to FIGS. 1 to 3, components of battery module 10 will now be described in more detail.

As illustrated in FIGS. 1 to 3, case 14 includes upper box 15 and lower box 16. Case 14 has a substantially rectangular parallelepiped shape that is longer in the front-rear direction than in the vertical direction and a lateral direction. The "lateral direction" used herein refers to a direction orthogonal to both the vertical and the front-rear directions. Case 14 is a metal- or resin-made housing, for example. In this exemplary embodiment, the plurality of battery blocks 12 is housed in lower box 16, and circuit component 22 and fan 24 are housed in upper box 15. First and second plates 40 and 50 are housed in the case at or near a level of a boundary between upper and lower boxes 15 and 16. An area in lower box 16 where the plurality of battery blocks 12 is housed is equivalent to battery compartment 14A.

Case 14 has cooling air inlet 17 through which lower space 70 and the outside of case 14 communicate and cooling air outlet 18 through which top space 71 and the outside of case 14 communicate. As described above, case 14 has gas outlet 19 through which gap 61 and the outside of case 14 communicate.

Cooling air inlet 17 is an opening that acts as an entrance to the cooling duct. Preferably, the cooling air inlets are formed in two places of lower box 16 in the front-rear direction. Cooling air inlets 17 are located at lateral middles on a front surface and a rear surface of lower box 16, respectively, and are each shaped into a slit that is long in the vertical direction. As described in detail later, lower space 70 is made between two battery blocks 12 arranged in the lateral direction and hence each cooling air inlet 17 is formed at a location corresponding to the space between the blocks.

Cooling air outlet 18 is an opening that acts as an exit from the cooling duct. Preferably, the cooling air outlet is formed in one place on the front of case 14. Cooling air outlet 18 is, for example, located at a lateral middle on a front surface of upper box 15, and is shaped into a circular form. In battery module 10, fan 24 is disposed at a location adjacent to cooling air outlet 18. Fan 24 introduces cooling air into case 14 by drawing the air through cooling air inlets 17. Cooling air introduced from cooling air inlets 17 passes through the cooling duct and is discharged from cooling air outlet 18. Instead of installation of fan 24 inside case 14, a duct may be connected to an outside of cooling air outlet 18 so that cooling air is supplied to the cooling duct by an external fan or similar devices.

Gas outlet 19 is an opening that acts as an exit from the exhaust duct. Preferably, the gas outlet is formed in one place on a rear of case 14. In this exemplary embodiment, gas outlet 19 is formed in a place opposite cooling air outlet 18 in a longitudinal direction of case 14. Gas outlet 19 is located at a lateral middle on a rear surface of case 14 so as to straddle upper and lower boxes 15 and 16, and is shaped into a substantially rectangular form that is long in the lateral direction.

FIG. 4 is a perspective view of battery block group 28 made up of four battery blocks 12 (12A, 12B, 12C, 12D). As illustrated in FIG. 4, four battery blocks 12 are integrated into battery block group 28 such that every two battery blocks 12 are arranged in each of the front-rear and the lateral directions. Battery blocks 12 that constitute battery block group 28 may engage with each other through parts such as holders described later or may be fastened to each other with screws or other fasteners. Battery block group 28 has a substantially rectangular parallelepiped shape that is long in the front-rear direction in the same way as case 14, and is housed in battery compartment 14A inside lower box 16, with no large gap left between the battery block group and an inner side wall of case 14. On an inner side wall surface of lower box 16 that defines battery compartment 14A, a plurality of ribs (see FIG. 3) is formed to allow battery block group 28 to be put into a predetermined position and be housed in lower box 16.

Four battery blocks 12 are similar in shape. In battery block group 28, for example, diagonally opposed battery blocks 12A, 12D are identical in shape, and battery blocks 12B, 12C are identical in shape. A configuration of the battery blocks will now be described with battery block 12A taken as an example. In battery block 12A drawn from battery block group 28, illustration of parts such as current collector plate 13 is omitted.

Battery block 12A includes block body 30 having a plurality of containers 31 into which respective batteries 11 are inserted and case-shaped lower holder 33 to house block body 30. Battery block 12 also has upper holder 32 that is attached to a top of block body 30 and that is fastened to lower holder 33 with screws. In other words, block body 30 is put between upper and lower holders 32 and 33 in the vertical direction. Block body 30 is a block-shaped component made from aluminum, an aluminum alloy, or other metals, for example.

Preferably, upper and lower holders 32 and 33 are made from a resin although the holders may be made from a metal. Lower holder 33 is disposed under block body 30 and includes bottom plate 37 having a plurality of openings 38 and side wall 39 that stands on bottom plate 37. Each opening 38 in bottom plate 37 exposes a bottom surface of battery case 11a that constitutes an external terminal of battery 11 and hence enables the battery to electrically connect with current collector plate 13. Side wall 39 is formed so as to cover side surfaces of block body 30 in the front-rear direction and one side of the lateral direction and surround three sides of block body 30.

Battery block 12A is disposed inside case 14 such that a side surface of block body 30 that is exposed without being covered with side wall 39 (hereinafter referred to as an exposed side surface) faces to a middle of case 14 in the lateral direction, i.e. toward battery block 12B. Similarly, battery blocks 12B, 12C, 12D are each disposed inside the case such that an exposed side surface of block body 30 faces other adjacent battery block 12 in the lateral direction. As described above, lower space 70, which constitutes a part of the cooling duct, is made between battery blocks 12 and hence the exposed side surface of each block body 30 faces lower space 70. As a result, metallic block bodies 30 with high thermal conductivity are directly exposed to cooling air. This configuration enables the battery module to efficiently cool batteries 11 housed in block bodies 30.

In this exemplary embodiment, lower holders 33 of battery blocks 12A, 12C arranged in the front-rear direction are in close contact with each other, and lower holders 33 of battery blocks 12B, 12D are in close contact with each other. Consequently, lower space 70 that forms a part of the cooling duct is not made between battery blocks 12A, 12C and between battery blocks 12B, 12D, whereas lower space 70 is made between battery blocks 12A, 12B and between battery blocks 12C, 12D that are arranged in the lateral direction. In other words, lower space 70 is a space extending inside case 14 in the front-rear direction. Cooling air inlets 17 are formed in portions of lower box 16 that correspond to both lengthwise ends of lower space 70.

Upper holder 32 is disposed above block body 30 and includes plate-shaped base 34 having a plurality of openings 35 and recess 36 depressed on a part of a periphery of base 34. Each opening 35 in base 34 exposes a top surface of battery case 11a that constitutes an external terminal of battery 11 and hence enables the battery to electrically connect with current collector plate 13. Since safety valve 11b is, for example, formed in the top surface of battery case 11a, opening 35 serves to expose safety valve 11b. A space contiguous to safety valve 11b exposed through opening 35 is upper space 60, which constitutes a part of the exhaust duct.

Base 34 has a substantially rectangular shape that is long in the front-rear direction in a plan view. Along a long side of base 34, recess 36 is formed so as to extend a length less than or equal to 50% of a length of the long side from one end of the base in the longitudinal direction, for example. A portion of base 34 adjacent to recess 36 in the longitudinal direction is protrusion 34p extending from block body 30. The length of recess 36 is not particularly limited. It is, however, preferred that the length of the recess ranges from 10% to 40% of the length of the long side of base 34. By changing the length of recess 36, a length of opening 21 in partition wall 20 described later can be adjusted.

Battery block 12A is disposed inside case 14 such that protrusion 34p and recess 36 face to the middle of case 14 in the lateral direction, i.e. toward battery block 12B. Similarly, battery blocks 12B, 12C, 12D are each disposed inside the case such that protrusion 34p and recess 36 face other adjacent battery block 12 in the lateral direction. Since battery blocks 12 are thus disposed to constitute battery block group 28, recesses 36 of battery blocks 12 gather around a center of battery block group 28 and are combined together so as to form one opening 21.

Protrusions 34p of adjacent battery blocks 12 in the lateral direction come into contact with each other such that a gap is created between the exposed side surfaces of block bodies 30 below protrusions 34p and a top of the gap is covered with protrusions 34p. In this exemplary embodiment, the gap constitutes lower space 70 that forms a part of the cooling duct, while protrusions 34p of upper holders 32 that cover a top of lower space 70 constitute partition wall 20. Tubular part 56 described later is inserted into opening 21 such that through path 51 is formed.

Battery block group 28 may have spacer 29 (see FIG. 3) that is mounted on upper holders 32. Spacer 29 is, for example, a wall that stands on a peripheral edge of a top surface of battery block group 28 and is mounted such that the wall surrounds all batteries 11 housed in battery blocks 12 in a plan view. If spacer 29 is mounted, spacer 29 constitutes a side wall for upper space 60 along the vertical direction. This side wall provides improved airtightness for sides of upper space 60 as compared to a side wall of lower box 16 acting as a side wall for upper space 60, for example. Upper space 60 is a space that is contiguous to safety valves 11b of batteries 11 and is surrounded with the top surface of battery block group 28 including partition wall 20, spacer 29, and a bottom surface of first plate 40.

Battery block group 28 may have a fastener portion including a screw hole into which a screw is inserted to fasten components such as first and second plates 40 and 50 disposed over battery block group 28. The fastener portion is formed on upper holder 32 and lower holder 33, for example. Lower holder 33 may have a fastener portion that is used to fasten battery block group 28 to lower box 16. Battery block group 28 is, for example, fastened to lower box 16 with screws that are tightened by penetrating through a bottom plate of the box from the outside.

FIG. 5 is a bottom perspective view of first plate 40.

As illustrated in FIG. 5, first plate 40 is substantially rectangular in a plan view and has through hole 41 that is formed at one end of the plate in the longitudinal direction. First plate 40 is disposed above battery block group 28 so as to cover battery block group 28. Together with partition wall 20 formed by upper holders 32, the first plate defines upper space 60 that constitutes the exhaust duct. First plate 40 is, for example, substantially identical to battery block group 28 in length in the front-rear direction (a length) and in length in the lateral direction (a width). The first plate is disposed over battery block group 28, with upper space 60 left between the first plate and the top surface of battery block group 28, so as to cover the top surface of battery block group 28 substantially entirely.

First plate 40 may be made of a resin. It is, however, preferred that the first plate be formed of a metal that is superior in heat resistance and thermal conductivity to the resin. A high-temperature gas that can be generated in response to an abnormality in battery 11 is usually emitted upward from safety valve 11b, so that first plate 40 is directly exposed to the high-temperature gas. Thus, first plate 40 is preferably a metallic plate with high heat resistance. Metallic first plate 40 can quickly diffuse heat of the gas and lower temperature of the gas, for example.

First plate 40 may be a flat metallic plate. It is, however, preferred that the first plate have wall 42 that is formed on a peripheral edge of a bottom surface. Wall 42 is, for example, formed by bending an edge of a metallic plate of first plate 40 downward such that the wall is substantially perpendicular to the bottom surface. Wall 42 is, for example, placed on an inside or an outside of spacer 29 for battery block group 28 so as to form the side wall for upper space 60. Alternatively, wall 42 may be disposed on top of spacer 29 so as to form the side wall for upper space 60.

As described above, through hole 41 in first plate 40 enables gap 61 formed between first and second plates 40 and 50 to communicate with upper space 60. Gap 61 communicates with the outside of case 14 through gas outlet 19. Thus, because of through hole 41 formed in first plate 40, gap 61 acts as the exhaust duct, and a high-temperature gas emitted into upper space 60 from safety valve 11b passes through gap 61 and is discharged to the outside from gas outlet 19. A shape and a size of through hole 41 are not particularly limited. Through hole 41 has a substantially rectangular shape that is long in a width direction of first plate 40 (the lateral direction), for example.

In this exemplary embodiment, through hole 41 is formed adjacent to the front of case 14, whereas gas outlet 19 is formed in the rear of case 14. In other words, first plate 40 is disposed such that through hole 41 is positioned at the front of case 14 opposite gas outlet 19. Through hole 41 may be formed in any place in first plate 40, with proviso that the through hole does not interfere with opening 43 described later. Preferably, the through hole is formed at a first end of a peripheral edge of first plate 40, and is, for example, formed at one longitudinal end of first plate 40. Gas outlet 19 is formed in a portion of case 14 (in the rear surface of case 14) located at a second end of the peripheral edge of first plate 40, i.e. the second end of the peripheral edge of first plate 40. Thus, the exhaust dust for through hole 41 formed at the first end of the peripheral edge can be made longer than an exhaust dust for through hole 41 formed in a middle of the first plate. With an increase in the length of the exhaust duct, the temperature of the gas discharged to the outside of case 14 goes down, for example. This prevents peripheral equipment for battery module 10 from being damaged. In particular, this exemplary embodiment provides through hole 41 formed at the one end of the peripheral edge of first plate 40 in the longitudinal direction and gas outlet 19 formed in a portion located at the other end of the peripheral edge of first plate 40 in the longitudinal direction, and thus advantageously ensures a length of the exhaust duct.

In a middle of first plate 40, opening 43 is formed. Like through hole 41, opening 43 is formed by passing through first plate 40 in a thickness direction. Opening 43 is an area that tubular part 56 forming through path 51 is inserted through and that is formed so as to fit a shape of tubular part 56. Since a cross section of tubular part 56 along the bottom surface of second plate 50 has a substantially rectangular shape that is long in the front-rear direction (the longitudinal direction), opening 43 has a substantially rectangular shape that is long in the longitudinal direction. First plate 40 may have a through hole through which a screw is inserted to fasten the plate or other parts to battery block group 28 or other components.

FIG. 6 is a bottom perspective view of second plate 50.

As illustrated in FIG. 6, second plate 50 is substantially rectangular in a plan view and is disposed above first plate 40 such that gap 61 is left between first and second plates 40 and 50. Second plate 50 is disposed face-to-face with a substantially overall area of a top surface of first plate 40 such that the second plate together with first plate 40 define a space forming the exhaust duct. The top surface of first plate 40 and the bottom surface of second plate 50, which face each other, are substantially parallel to each other, for example. In this exemplary embodiment, tubular part 56 disposed on second plate 50 has through path 51, which is formed to let lower space 70 communicate with top space 71, a space above second plate 50.

Second plate 50 may be made of a metal. It is, however, preferred that the second plate be formed of a resin that is superior in plasticity and thermal insulating property to the metal. Second plate 50 made of a resin with high plasticity facilitates making of gas conduit 54 having a labyrinthine structure described later. Although the bottom surface of second plate 50 facing gap 61 is exposed to a high-temperature gas, the temperature of second plate 50 made of a resin is hindered from rising. This readily prevents heat from impacting on circuit component 22 and other parts. Preferably, the resin that constitutes second plate 50 is a resin that is satisfactory in heat resistance, flame resistance, and plasticity or formability. In one example, polyethylene terephthalate (PBT) is a preferable resin. The resin may contain a substance such as a filler or an additive to improve heat resistance, flame resistance, and other properties.

Second plate 50 may be a flat resin plate. It is, however, preferred that the second plate have wall 52 that is formed on a peripheral edge of a bottom surface. Wall 52 is, for example, formed by extending downward from the peripheral edge of the bottom surface of second plate 50 such that the wall is substantially perpendicular to the bottom surface. Wall 52 abuts on the top surface of first plate 40 and constitutes a side wall for gap 61, a space for exhaust gas. Conduit outlet 55 is formed in a part of wall 52. Conduit outlet 55 is an opening that acts as an exit from gas conduit 54 formed in gap 61. Preferably, the conduit outlet is formed at an end of second plate 50 in the longitudinal direction. Second plate 50 is disposed such that conduit outlet 55 facing the rear of case 14 is adjacent to gas outlet 19.

On the bottom surface of second plate 50, division wall 53 is formed so as to extend in a direction intersecting with a direction in which the exhaust gas flowing through gap 61 travels. Division wall 53 is, for example, formed by extending downward from the bottom surface of second plate 50 to have a length identical to that of wall 52 such that the division wall is substantially perpendicular to the bottom surface. A high-temperature gas emitted from safety valve 11b of battery 11 goes into gap 61 and flows from a first longitudinal end of second plate 50 located directly above through hole 41 of first plate 40 to a second longitudinal end of second plate 50 where conduit outlet 55 is disposed. In other words, the direction in which the exhaust gas travels in gap 61 is a longitudinal direction of second plate 50. In gap 61, division wall 53 forms serpentine gas conduit 54 having what is called a labyrinthine structure.

A plurality of division walls 53 is, for example, formed along a width direction of second plate 50, i.e. substantially perpendicular to the exhaust gas travel direction. Tubular part 56 exists in a middle of second plate 50 and some division walls 53 are lined up alongside tubular part 56 in the longitudinal direction of the plate. As a result, two serpentine gas conduits 54 are formed in gap 61. One of division walls 53 adjacent to each other in the exhaust gas travel direction extends from tubular part 56 toward wall 52, with a gap left between the division wall and wall 52, whereas the other of division walls 53 extends from wall 52 toward tubular part 56, with a gap left between the division wall and tubular part 56. Division walls 53 are formed repeatedly in this way such that two serpentine gas conduits 54 are formed in gap 61.

Tubular part 56 formed in the middle of second plate 50 penetrates first plate 40 and partition wall 20 and includes through path 51. Tubular part 56 is disposed at a middle in both the longitudinal and the width directions of second plate 50. Tubular part 56 is formed, for example, substantially perpendicular to the bottom surface of second plate 50, extending downward from the bottom surface beyond a lower end of wall 52. Tubular part 56 penetrates through second plate 50 in a thickness direction, and a space inside the tubular part has uncovered openings on both ends in the vertical (axial) direction. Tubular part 56 is shaped into a rectangular tube such that the cross section of the tubular part along the bottom surface of second plate 50 has, as described above, a substantially rectangular shape that is long in the front-rear direction.

Tubular part 56 is inserted through opening 43 of first plate 40 and opening 21 of partition wall 20, and the space inside the tubular part constitutes through path 51 by which lower space 70 is connected to top space 71. The lower space communicates with the outside via cooling air inlets 17, whereas the top space communicates with the outside via cooling air outlet 18. Tubular part 56 is partly disposed in upper space 60 and gap 61 that constitute the exhaust duct. However, the gas flowing along the exhaust duct does not normally flow into through path 51 because no opening is formed in a side surface of tubular part 56. A lower end of tubular part 56 is inserted into opening 21 or connected to a peripheral edge of opening 21 such that lower space 70 is connected to top space 71, and the cooling duct and the exhaust duct, which are isolated from each other, are formed.

Figure 7:
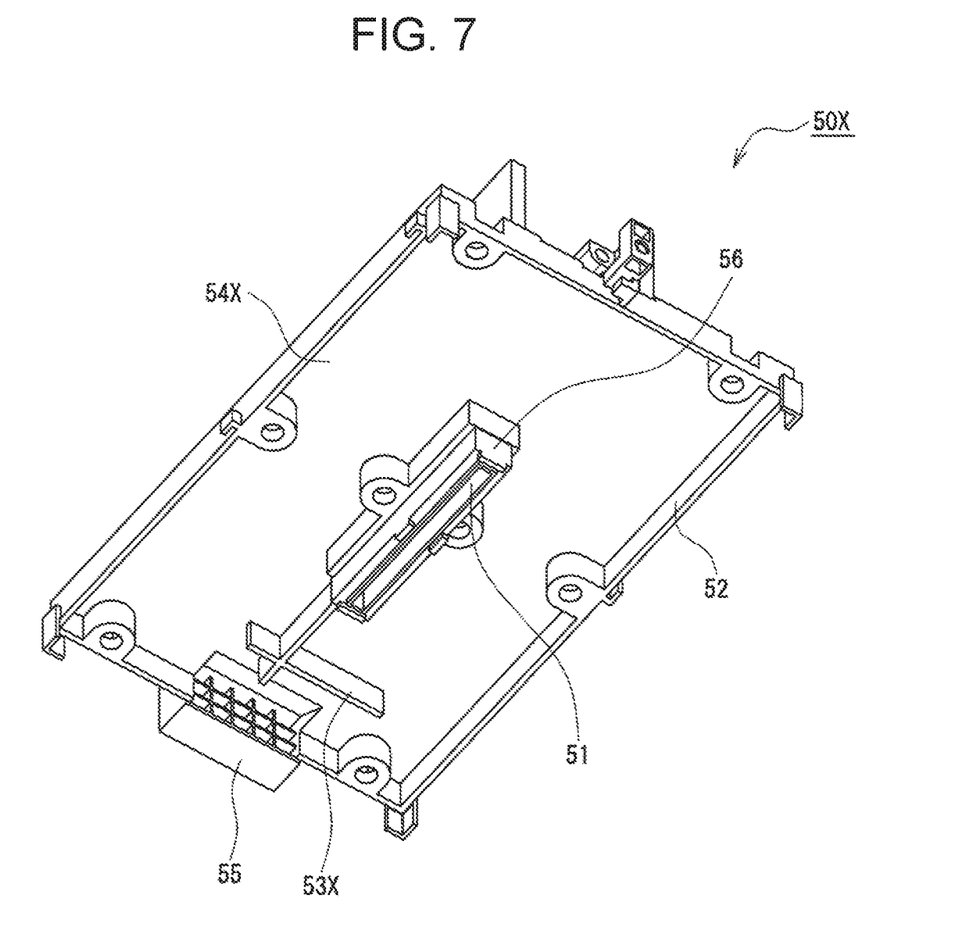
FIG. 7 is a bottom perspective view of a second plate according to another example of the exemplary embodiment.

FIG. 7 illustrates second plate 50X that does not form a gas conduit having a labyrinthine structure. Second plate 50X differs from second plate 50 in that division wall 53X is formed only near conduit outlet 55. Division wall 53X is formed along a width direction of second plate 50X. Division wall 53X, for example, has a length substantially equal to that of conduit outlet 55 and faces conduit outlet 55, with a gap left between the division wall and conduit outlet 55. This example, owing to no serpentine gas conduit formed in gap 61, enables the gas to be smoothly discharged as compared to the battery module including second plate 50, and hinders pressure inside case 14 from rising, for example. Since division wall 53X is partly lined up alongside tubular part 56 in the longitudinal direction of the plate, second plate 50X as well has two gas conduits 54X formed in gap 61. However, gas conduits 54X are each a conduit extending substantially straight in the longitudinal direction of second plate 50X except a part near conduit outlet 55.

Figure 8:
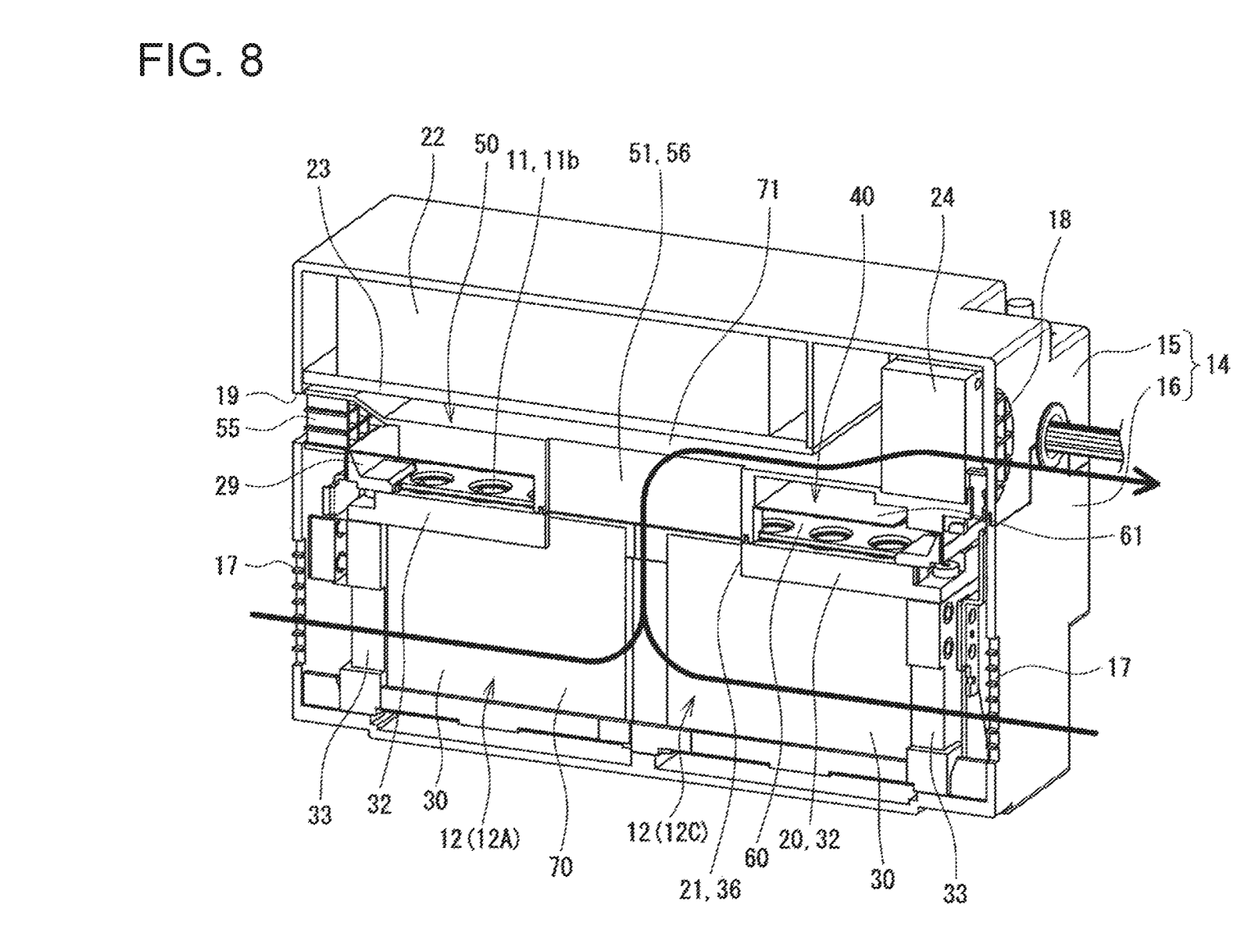
FIG. 8 is a cross-sectional view taken along line VIII-VIII of FIG. 1.
Figure 9:
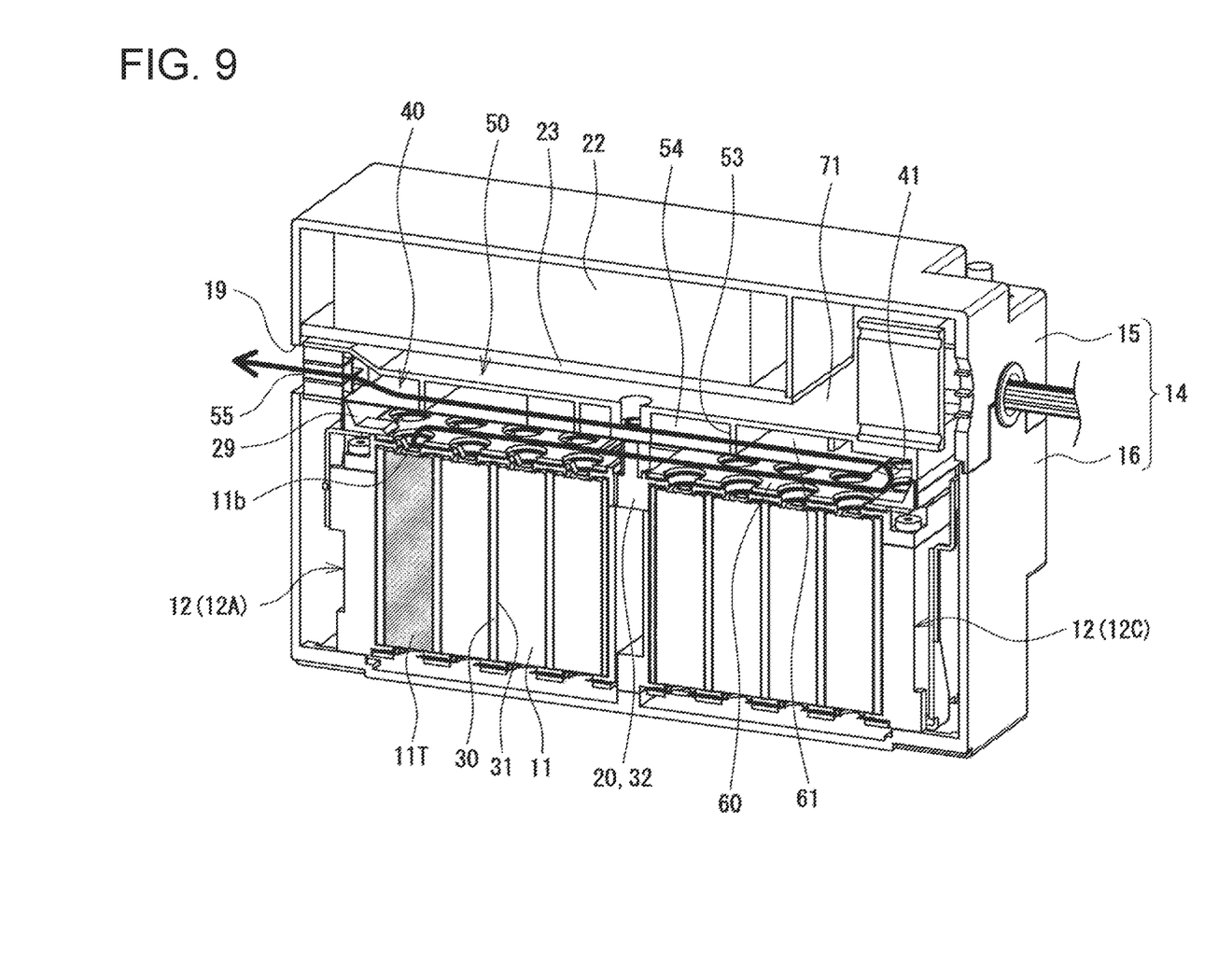
FIG. 9 is a cross-sectional view taken along line IX-IX of FIG. 1.

With reference to FIGS. 8 and 9, the cooling duct and the exhaust duct formed by partition wall 20, the two plates described above, or other components will now be described. FIG. 8 is a cross-sectional view taken along line VIII-VIII of FIG. 1. FIG. 9 is a cross-sectional view taken along line IX-IX of FIG. 1.

In FIG. 8, a route through which cooling air flows is indicated by an arrow. In response to activation of fan 24 housed in the upper part of case 14, cooling air is drawn into case 14 through cooling air inlets 17 (lower openings) formed in the front surface and the rear surface of lower box 16. The cooling air flows into lower space 70 formed between battery blocks 12, more specifically, between battery blocks 12A, 12B and between battery blocks 12C, 12D (see FIG. 4) of battery block group 28, housed in the lower part of case 14. Since a side surface of each block body 30 that is exposed without being covered with lower holder 33 is in contact with lower space 70, the battery module can efficiently cool batteries 11 housed in block bodies 30.

Lower space 70 is separated from upper space 60 by partition wall 20, which is formed by combining upper holders 32 of battery blocks 12 together. Thus, cooling air does not normally flow into upper space 60. Tubular part 56 of second plate 50 is connected to opening 21 of partition wall 20 formed in the middle of case 14 such that through path 51 is formed. Lower space 70 communicates with top space 71, in which circuit component 22 and other parts are disposed, via through path 51. As a result, cooling air flowing through lower space 70 flows into top space 71 through through path 51 and is discharged to the outside via cooling air outlet 18 formed in a front surface of upper holder 32.

In battery module 10, as described above, lower space 70 and through path 51 constitute the cooling duct. Top space 71, in which circuit component 22 and other parts are disposed, is a space cooled by cooling air and thus constitutes a part of the cooling duct. In this exemplary embodiment, cooling air flows into the cooling duct from both longitudinal ends of case 14 (battery block group 28) and passes through the middle of battery block group 28. This configuration, for example, allows uniform cooling of battery blocks 12 and provides a shortened airflow distance that leads to a downsizing of fan 24.

In FIG. 9, a route through which gas is discharged in response to the emission of a high-temperature gas from safety valve 11b of battery 11T is indicated by an arrow. FIG. 9 indicates the exhaust gas route with a straight line although serpentine gas conduit 54 is formed in gap 61. As illustrated in FIG. 9, when safety valve 11b of battery 11T is opened, the high-temperature gas is emitted into upper space 60. Since upper space 60 is separated from lower space 70 by partition wall 20, the high-temperature gas does not normally advance into the cooling duct. Thus, circuit component 22 and other parts disposed in top space 71 are not exposed to the high-temperature gas. Since upper space 60 is defined by partition wall 20 together with spacer 29 and first plate 40, the high-temperature gas does not normally leak through any place other than gas outlet 19.

The high-temperature gas emitted into upper space 60 flows toward the front of case 14 through upper space 60 and comes into gap 61 via through hole 41 of first plate 40. The high-temperature gas that has come into gap 61 meanders along gas conduits 54 formed by division walls 53 of second plate 50 to flow to conduit outlet 55 formed at the rear of case 14 and is discharged to the outside from gas outlet 19. Thus, long serpentine gas conduits 54 formed in gap 61 and a highly thermal conductive metal plate adopted for first plate 40 contribute to a substantial reduction in the temperature of the gas discharged from gas outlet 19.

In battery module 10, as described above, the exhaust duct has a two-layer structure made up of upper space 60 and gap 61. Battery module 10 having the above configuration enables efficient formation of an exhaust duct and a cooling duct that are isolated from each other without leading to compromises such as a drop in the amount of installed batteries 11 and upsizing of the module.

The invention claimed is:
1. A battery module including a plurality of batteries each having a safety valve and a case in which the plurality of batteries are housed and arranged, the battery module comprising:
a partition wall to separate an upper space above a battery compartment housing the plurality of batteries in the case from a lower space communicating with an outside of the case and being formed in the battery compartment below the upper space;
a first plate disposed above the plurality of batteries so as to cover the plurality of batteries, the first plate defining the upper space together with the partition wall;
a second plate disposed above the first plate in such a way that a gap is defined between the first and the second plates;
an opening that is formed in the case to let the gap communicate with the outside of the case; and
a through path isolated from the upper space and the gap, the through path passing through the partition wall, the first plate, and the second plate such that the lower space is in fluid communication with a space above the second plate,
wherein the first plate has a through hole through which the upper space and the gap communicate, and
wherein
the gap between the first plate and the second plate constitutes an exhaust duct,
the lower space, the through path, and the space above the second plate constitute a cooling duct,
the cooling duct forms a cooling passage that includes the space above the second plate and the lower space fluidly connected to each other, the space above the second plate and the lower space sandwiching the exhaust duct,
the through path is located centrally in the first plate and the second plate, and the exhaust duct surrounds a portion of the cooling duct constituting the through path,
the through path is defined by a tubular part that extends from a bottom surface of the second plate into the gap and towards the first plate, and
the tubular part is received in an opening in the first plate.

2. The battery module according to claim 1,
wherein the first plate is formed of a metal, and
wherein the second plate is formed of a resin.

3. The battery module according to claim 1, further comprising a circuit component disposed above the second plate.

4. The battery module according claim 1, wherein on a bottom surface of the second plate facing the gap, a division wall is formed so as to extend in a direction intersecting with a direction in which an exhaust gas flowing through the gap travels.

5. The battery module according to claim 1,
wherein the through hole is formed at a first end of a peripheral edge of the first plate, and
wherein the opening is formed in a portion of the case located at a second end of the peripheral edge of the first plate.

6. The battery module according to claim 1,
wherein a lower opening is formed in each end of the case in a longitudinal direction to let the lower space communicate with the outside of the case, and
wherein the through path is formed so as to pass through longitudinally middles of the first and the second plates, respectively.

7. The battery module according to claim 1, comprising a plurality of battery blocks each housing the batteries, wherein the battery blocks are arranged in a direction identical to a direction in which the batteries are arranged, and wherein the lower space is made between the battery blocks, and the batteries are adjacent to the lower space through each of the battery blocks.

\* \* \* \* \*